United States Patent [19]
Donahue et al.

[11] 3,951,464
[45] Apr. 20, 1976

[54] TRUCK-TRAILER BRAKE SYSTEM WITH INDEPENDENT CONTROL OF TRAILER BRAKES

[76] Inventors: James C. Donahue, P.O. Box 126, Durham, Kans. 67438; John T. Ramsey, 3921 S. Webb Road, Wichita, Kans. 67210

[22] Filed: Aug. 30, 1974

[21] Appl. No.: 502,162

[52] U.S. Cl. .................. 303/7; 137/513.3; 188/3 R; 303/2; 303/10; 303/13
[51] Int. Cl.² .......................... B60T 13/00
[58] Field of Search ............. 303/7, 9, 13, 15, 2, 303/3, 68, 69, 10, 87, 6 R; 137/513.3; 188/3 R

[56] References Cited
UNITED STATES PATENTS

| | | | |
|---|---|---|---|
| 2,818,138 | 12/1957 | Ostwald et al. | 303/7 |
| 2,985,489 | 5/1961 | Stelzer | 303/7 X |
| 3,350,142 | 10/1967 | Schumann | 303/7 |
| 3,377,109 | 4/1968 | Scott | 303/6 R X |
| 3,507,541 | 4/1970 | Ayers, Jr. | 303/7 |
| 3,695,731 | 10/1972 | England et al. | 303/7 |
| 3,827,758 | 8/1974 | Hansen | 303/13 X |
| 3,843,206 | 10/1974 | Teagle | 303/7 |

*Primary Examiner*—Trygve M. Blix
*Assistant Examiner*—Douglas C. Butler
*Attorney, Agent, or Firm*—John A. Hamilton

[57] ABSTRACT

A truck-trailer brake system including a standard hydraulic brake system of the truck, an electrically powered hydraulic brake system for a trailer, the components of which are mountable on the trailer, the trailer brake system being powered by the truck electrical system so as to be automatically actuated in coordination with the truck brake system whenever the truck brakes are applied. The trailer brakes may be operated independently of the truck brakes, as may be desired in special circumstances. Also, the hydraulic power components of the trailer system may be utilized for operating hydraulic accessories of the trailer, and the trailer brakes are applied automatically in case the trailer should break away from the truck.

6 Claims, 1 Drawing Figure

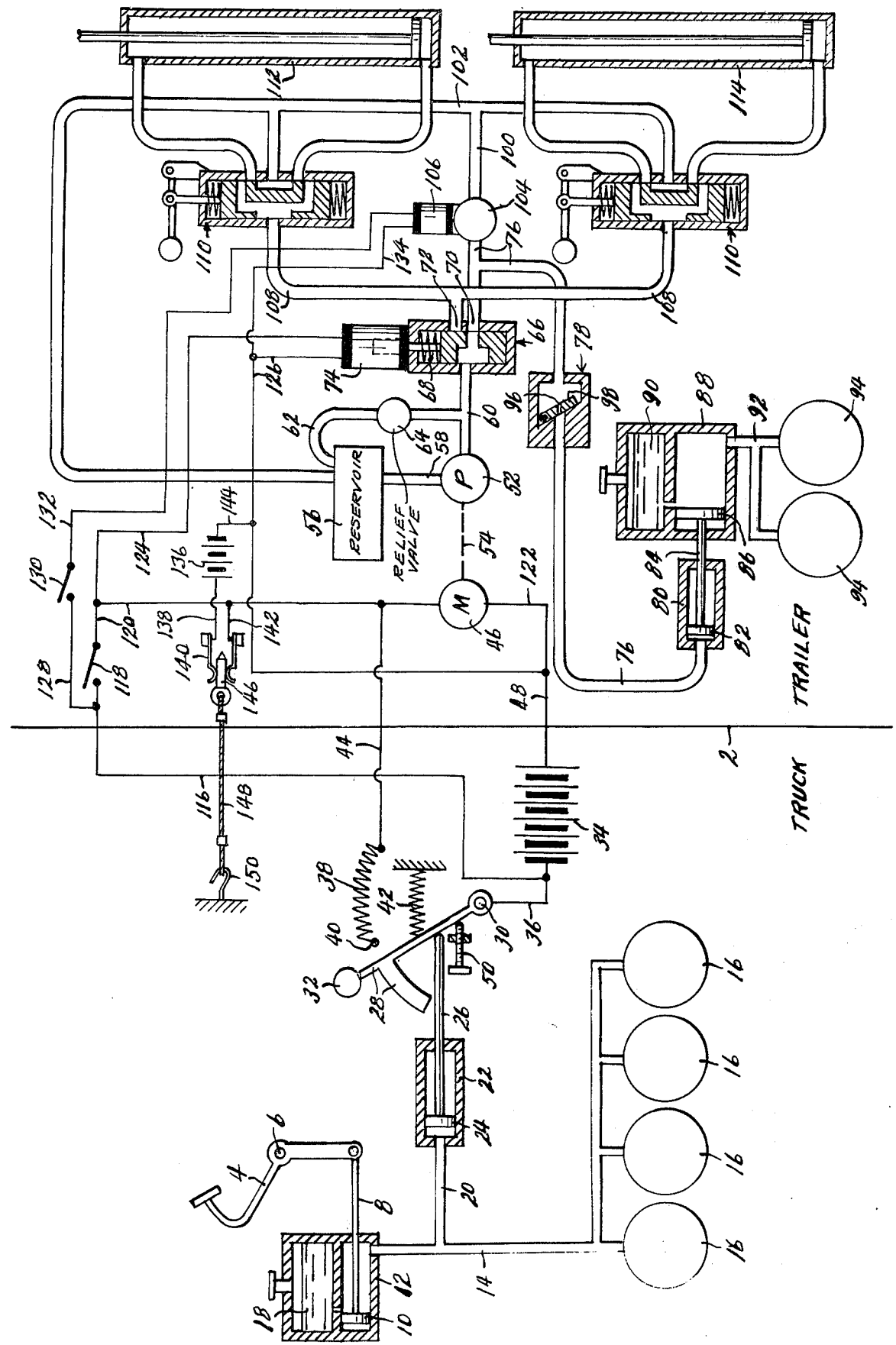

TRUCK-TRAILER BRAKE SYSTEM WITH INDEPENDENT CONTROL OF TRAILER BRAKES

This invention relates to new and useful improvements in vehicular braking systems, and has particular reference to a braking system applicable to a truck and a trailer towed by the truck.

Truck-trailer brake systems, particularly when the truck is the common pick-up truck, have always presented certain problems. Such trucks are virtually never equipped with air brake systems, so that the trailer cannot be equipped with air brakes powered by the truck system, and in any event this would necessitate the inconvenience of making pig-tail air hose connections to the trailer. Electric trailer brakes, powered by the truck electrical system and controlled from the truck cab, are sometimes used but seldom have the braking capacity required for the extremely heavy trailer loads which are all too common. Most smaller trucks of this type are equipped with hydraulic brakes, but these hydraulic systems do not have sufficient fluid capacity or delivery rates to operate the trailer as well as the truck brakes, even if a pig-tail hydraulic hose connection to the trailer were provided.

Accordingly the primary object of the present invention is the provision of a truck-trailer brake system which overcomes all of the above enumerated shortcomings of previous systems in an effective, simple and economical manner. Generally, this object is accomplished by the provision of a system utilizing the truck's own hydraulic brake system, substantially without change, together with a trailer brake system which is also hydraulic, but is powered by a hydraulic pump driven by an electric motor carried by the trailer, but powered and controlled from the turck cab, so that only simple electrical connections between the truck and trailer are required.

Another object is the provision of a braking system of the character described in which the trailer as well as the truck brakes are applied and controlled by the usual brake pedal of the truck.

A further object is the provision of a braking system of the character described in which the relative braking rate or force of application of the truck and trailer brakes may be closely coordinated or equalized.

A still further object is the provision of a braking system of the character described wherein the sequence of application can be altered as desired in special circumstances, for example, to apply the truck brakes first if only a slight braking or slowing is required, or to apply the trailer brakes first is severe braking is required, or when driving on slick or loose road surfaces, in order to avoid possible jack-knifing of the truck and trailer.

Still another object is the provision of a braking system of the character described wherein the hydraulic pump and motor of the trailer brake system may be employed to operate various hydraulically-operated accessories of the trailer, such as a dump-bed, or a ground-engaging leg in the case of a two-wheeled trailer. The trailer brakes may be automatically disabled or left applied whenever the system is used to operate the accessories, as desired.

A still further object is the provision of a braking system of the character described wherein the trailer brakes are applied either with a single operating force, in which case provision is made for applying the truck brakes somewhat before the trailer brakes are applied, to permit gradual braking by use of the truck brakes only, or in which the application force of the truck and trailer brakes are closely equalized, in which case provision is made for initiating the trailer brake force somewhat sooner than the truck brakes, and are applied with slightly greater pressure, in order that the trailer brakes will "dominate" the truck brakes to prevent jack-knifing.

Still another object is the provision of a braking system of the character described including means for automatically applying the trailer brakes in the event the trailer should accidentally break away from the truck.

With these objects in view, as well as other objects which will appear in the course of the specification, reference will be had to the accompanying drawing, wherein the single view is a schematic diagram of a truck-trailer brake system embodying the present invention.

Referring to the drawing, it will first be understood that those elements of the system appearing to the left of dividing line 2 are carried by a truck, and that those elements to the right of said line are carried by a trailer being towed by the truck. The brake pedal 4 of the usual hydraulic brake system of the truck is pivoted at 6, and is operable when depressed to act through a mechanical linkage 8 to advance a piston 10 in a master brake cylinder 12 to deliver hydraulic brake fluid through a conduit 14 to the brake mechanisms 16 at the individual wheels of the truck. Although shown only schematiclly, it will be understood that each of these brake mechanisms includes a hydraulic wheel cylinder operable by fluid delivered thereto by conduit 14, brake shoes or the like operable by the wheel cylinder to brake rotation of the wheel, and spring means operable to release the brake shoes and return fluid to the master cylinder whenever pressure therein is reduced by easing pressure on pedal 4. The master cylinder is kept replenished with brake fluid, to replace any leakage in the system, from a brake fluid reservoir 18, in a manner well known in the art. The truck brake system thus described in summary is of course standard.

According to the present invention, there is provided a conduit 20 tapped into conduit 14 and interconnected into a hydraulic actuating cylinder 22 in which a piston 24 is operably mounted. Fixed to said piston is a piston rod 26 which at its outer end engages an operating handle 28 pivoted at 30. Said handle, which may be manually pivoted by knob 32, constitutes a switch arm to which one terminal of the truck battery 34 is connected by wire 36, and which is operable as said arm is pivoted to the right, as shown, to traverse a speed control device such as a rheostat 38. Said rheostat has an end contact 40, arm 28 normally being held in spaced apart relation from contact 40 by a spring 42, the opposite end of the rheostat being connected by a wire 44 to a variable-speed electric motor 46 carried by the trailer, the opposite terminal of said motor being connected by wire 48 to the opposite terminal of battery 34. This is the primary motor circuit. Wires 44 and 48, as well as any other electrical connections required between the truck and the trailer may be included in a simple, easily connected flexible cable extending therebetween. The normal spacing between switch arm 28 and rheostat contact 40 can be adjusted by means of a manually operable adjusting screw 50, although it will be understood that said switch arm may be advanced from any position provided by screw 50 to first engage contact 40, then traverse the full length of the rheostat coil, either manually by grasping knob 32, or automatically in response to depression of brake pedal 4, which advances piston rod 26. Cylinder 22 is kept properly supplied with brake fluid by master cylinder reservoir 18, regardless of the setting of screw 50. the separation of switch arm 28 from contact 40 provides a positive on-off switch action, as well as the speed control provided by the rheostat coil. The speed of operation of motor 46 is generally proportionate to the electric voltage supplied thereto, which in turn is dependent on the position of arm 28 on coil 38. It will be understood that arm 28, after first engaging contact 40 maintains engagement with said contact at all subsequent positions of said arm.

Motor 46 drives a hydraulic pump 52 through an operating drive connection 54 therebetween, and said pump is of a type such that its delivery pressure is generally proportionate to its speed of operation, that is, to the speed of motor 46. Said pump receives hydraulic fluid from a reservoir 56, also carried by the trailer, through a conduit 58, and delivers said fluid under pressure to a conduit 60. Fluid from conduit 60 may be returned to reservoir 56 through a conduit 62, in which is interposed a relief valve 64 which is operable to be opened by a maximum design operating pressure of pump 52, in order to protect the pump against damage.

Delivery conduit 60 is connected to a solenoid-controlled selector valve 66 operable to be positioned normally, by a spring 68, to connect conduit 60 with a valve outlet 70, but to connect conduit 60 to a second valve outlet 72 when solenoid 74 of said valve is electrically energized. Valve outlet 70 is interconnected with a conduit 76 which delivers hydraulic fluid through a damper valve 78 to a brake actuator cylinder 80 in which is operably disposed a piston 82 connected by a piston rod 84 to a piston 86 operable in a master brake cylinder 88, whereby to deliver brake fluid from a fluid reservoir 90 through conduit 92 to the brake mechanisms 94 at the individual wheels of the trailer, which may be similar to mechanisms 16. Only two such mechanisms are shown, pre-supposing a two-wheeled trailer, but the number is of course optional. Damper valve 78 constitutes essentially a swing-check valve operable to permit fluid flow only away from brake mechanisms 94, but having a restricted orifice 96 in the gate 98 thereof. the orifice permits fluid flow to apply the trailer brakes, but only at a restricted rate, whereby to prevent over-extreme and sudden application of the brakes if motor 46 should be started at full speed, but the gate swings open whenever motor 46 is stopped, in order to permit rapid release of the brakes. Outlet 70 is also connected by a conduit 100 to a hydraulic return conduit 102 for returning hydraulic fluid to reservoir 56, a normally-closed control valve 104, operable to be opened by electrical energization of its solenoid 106, being interposed in conduit 100.

Outlet 72 of selector valve 66 is connected by conduits 108 to a pair of manually operable control valves 110, the specific operation of which is not pertinent to the present brake system, but which it will be understood are operable to supply and control hydraulic circuits for a pair of doubleacting hydraulic cylinders 112 and 114 whenever selector valve 66 is set to supply hydraulic fluid to conduits 108. Cylinders 112 and 114 may control various power operations necessary of desired relative to the trailer, such for example as controlling a tilting dump bed of the trailer, or operating a retractable ground-engaging leg of the trailer for supporting the trailer when it is not connected to the truck, if the trailer is of the two-wheeled variety.

A secondary operating circuit for motor 46 is provided from battery 34 through wire 116, a manually controlled switch 118, wire 120, motor 46, and wires 122 and 48 to the battery. A circuit for solenoid 74 of selector valve 66 is provided from battery 34 through wire 116, switch 118, wires 120 and 124, solenoid 74, and wires 126 and 48 to the battery. A circuit for solenoid 106 of control valve 104 is provided from battery 34 through wires 116 and 128, a manually operable switch 130, wire 132, solenoid 106, and wires 134, 126 and 48 to the battery. Switches 118 and 130 are shown mounted on the trailer, but obviously they could also be mounted on the truck in a position accessible to the driver. A tertiary operating circuit for motor 46 is provided from a battery 136, which may be a simple 12 volt dry cell type and is mounted on the trailer, through wire 138, switch 140, wires 142 and 120, motor 46 and wires 126 and 144 to battery 136. Switch 140 is of the normally closed variety, but at most times is held open by a pin 146 inserted between the contacts thereof. Said pin is connected by a normally slack cable 148 to a hook 150 or the like mounted on the truck. Thus, if the trailer should accidentally break away from the truck, cable 148 will pull pin 146, allowing switch 140 to energize motor 46 from battery 136, so that the trailer brakes will be applied to bring the trailer to a halt.

In operation, it will be seen that when the driver of the truck depresses pedal 4 to apply the brakes, fluid under pressure is supplied to conduit 14 by master cylinder 12 to actuate the truck brake mechanism 16 in the usual well known manner. At the same time, fluid pressure through conduits 14 and 20 acts through actuator cylinder 22 to advance contact arm 28, first to engage contact 40 to complete the primary circuit of motor 46, but through the full resistance of rheostat 38, and then to advance said arm along the rheostat coil to reduce progressively the resistance in the motor circuit, and hence progressively to increase the operating speed of the motor. Operation of motor 46 activates pump 52 to deliver fluid to outlet 70 of selector valve 66, and hence to conduit 76 to operate the trailer brake mechanisms 94, so long as solenoids 74 and 106 are not energized, as indicated by an open condition of switches 118 and 130. Hence, so long as the elements of the system have been properly selected and coordinated, the truck and trailer brakes will be applied simultaneously, or nearly so. Also, they will be applied with matching hydraulic pressures, it being apparent that if pedal 4 is depressed farther and with greater pressure to apply the truck brakes more severely, the greater pressure in actuating cylinder 22 will move contact arm 28 farther along rheostat 38 to increase the speed of motor 46 and hence the output pressure of pump 52, whereby the trailer brakes are applied with a correspondingly greater pressure.

It will be noted that there is inherently a degree of lost motion of pedal 4, before the truck brakes become effective, due of course to the fact that the normal spacing between the brake shoes and drums must be closed before the brake action can begin. During this lost motion, actuating cylinder 22 is being advanced by fluid pressure to advance contact arm 28 to a position short of, just engaging, or even beyond contact 40, the degree of motion of said arm before it engages contact 40 being regulated by adjusting screw 50. This fact may be utilized to produce a significant adjustment amounting to a rather basic modification of the system.

For example, in truck-trailer brake systems, it is commonly preferred that the trailer brakes be applied slightly before the truck brakes are applied, and also applied with at least a slightly greater pressure at all times, in order to prevent any possibility of jack-knifing of the truck and trailer. In the present system, this sequence and relative pressures of the truck and trailer brakes can be obtained by so adjusting screw 50 that contact arm 28 engages contact 40, and hence initiates the trailer brake action already described, before pedal 4 has been depressed to a sufficient degree to initiate any truck braking action at all, and also to provide that the trailer braking pressure will be slightly higher than the truck braking pressure at all times. This would be the normally desired setting of screw 50. This desired adjustment may be obtained, with the truck-trailer combination in movement, by depressing pedal 4 until truck braking action is just started, then allowing the pedal to rise very slightly, then adjusting screw 50 until arm 28 just engages contact 40, as signalled by the starting of motor 46.

On the other hand, screw 50 could also be backed off to such a degree that the truck braking action is started before arm 28 engages contact 40, and this permits a simpler, more economical modification of the system. In this modification, rheostat 38 would be eliminated, so that arm 28 and contact 40 constitute a simple on-off switch, and motor 46 may be a single-speed motor, driving pump 52 at a speed to supply full operating pressure to the trailer brakes. The truck brakes would, however, be applied first, with skill enough spacing between arm 28 and contact 40 to permit some variation of the truck brake pressure without actuating the trailer brakes. This would permit gradual slowing of the truck-trailer combination, at rates creating no danger of jack-knifing, by use of the truck brakes only. However, if a slightly greater pressure is exerted on pedal 4, arm 28 engages contact 40 to energize motor 46 to apply the trailer brakes with full force, so that the trailer brakes "dominate" the truck brakes to eliminate the danger of jack-knifing which could occur at higher rates of deceleration. This is entirely practical, and represents a workable system, so long as the trailer brakes are not applied so suddenly as to cause initial skidding of the trailer wheels. This gradual application of the trailer brakes is provided by damper valve 78, despite the fact that motor 46 may be started suddenly at full speed. When the truck-trailer combination has slowed to such a degree that danger of jack-knifing no longer exists, the trailer brakes may be released by easing pressure on pedal 4 to such a degree that arm 28 no longer engages contact 40, and the combination brought to a final halt by use of the truck brakes only, also with no skidding.

It only in connection with the single-speed motor modification just described that the use of damper valve 78 is particularly important, since in the previously described modification using a variable-speed motor and speed control rheostat 38, the trailer brakes are applied only with a pressure corresponding to the pressure exerted on pedal 4. Nevertheless, even with the presently described single-speed motor modification, the use of damper valve 78 is desirable in connection with the operation of the trailer brakes by auxiliary battery 136 and switch 140, which occurs when the trailer accidentally breaks away from the truck, as by breakage of the trailer hitch, since the damper valve will be effective in reducing or stopping skidding of the disconnected trailer.

With the present system, the truck-trailer combination may be slowed and stopped by use of the trailer brakes only, by grasping knob 32 to advance arm 28 manually. This type of braking action is usually desirable when the road surface is very slick, or is loose sand or gravel, in order to avoid jack-knifing.

When it is desired to operate accessory cylinder 112 and 114 with pump 52, which would normally occur only when the truck and trailer are at rest, the operator closes switch 118. This completes the secondary circuit of motor 46, not including rheostat 38, so that said motor operates at full speed, and also energizes solenoid 74, setting selector valve 66 to deliver fluid from pump outlet conduit 60 to outlet 72 of said valve, and hence to accessory cylinders 112 and 114 under the control of valve 110. The operation of the accessories and their control valves is not pertinent to the present invention, except insofar as the braking system is related thereto.

It will be seen that when selector valve 66 is actuated by energization of solenoid 74, the trailer brake system is sealed off by said valve at whatever pressure existed therein at the moment said solenoid is energized, thus locking the trailer brakes at that pressure. This locking of the trailer brakes may be desired in most cases, since most accessory operations are carried out with the trailer at rest, and the locking of its brakes serves to hold it reliably stationary. It may be accomplished deliberately, by closing switch 118 with the trailer brakes already applied, or it may occur accidentally if the truck driver and an operator on the trailer do not coordinate their movements. However, whether locking of the trailer brakes has been brought about deliberately or accidentally, they may be released by closing switch 130, which energizes solenoid 106 to open valve 104 to vent the trailer brake system to reservoir 56. This may be desired in certain accessory operations, for example, while tilting a trailer dump bed gradually during slow forward movement to spread its contents on the ground, which requires the truck and trailer brakes to be released. Of course, during this operation the trailer brakes are completely inoperative, and sole reliance must be made on the truck brakes, but this is permissable in view of the very slow speeds commonly involved in such operations.

Locking of the trailer brakes by selector valve 66 might create a tendency by careless operators to leave a trailer held only by said brakes, rather than by "parking" brakes or wheel chocks, not shown. This would not be safe, due to the at least small leakage inherent in any hydraulic system. However, in the present system, any such careless tendencies are defeated by detachment of the trailer from the truck, which automatically de-energizes solenoid 74, allowing selector valve 66 to be reset by spring 68 to vent the trailer brake system to reservoir 56.

While we have shown and described a specific embodiment of our invention, it will be readily apparent that many minor changes of structure and operation could be made without departing from the spirit of the invention. For example, it switches 118 and 130, together with control valves 110, were positioned in the truck cab in a position accessible to the driver, he could control not only the brake system but also the accessory system from that position. If motor 46 were removed from the circuit of switch 118, said motor would remain under the control of contact arm 28 and rheostat 38, and the operator could control the accessories by manual manipulation of the contact arm. It is considered that these variations, as well as others, lie within the scope of this invention.

What we claim as new and desire to protect by Letters Patent is:

1. A brake system for a truck-trailer combination comprising:
   a. a truck brake system including a pedal and being operable to apply the truck brakes by depression of said pedal,
   b. a trailer brake system including an electric motor, and operable by energization of said motor to apply the trailer brakes,
   c. an operating electrical circuit for said electric motor, said circuit including a normally open control switch and the battery of the truck electrical system,
   d. control means operable by depression of said pedal to close said control switch,
   e. an auxiliary source of electrical power carried by said trailer and independent of the truck electrical system,
   f. another operating electrical circuit including said motor, auxiliary power source, and a normally open safety switch, and
   g. operating means for said safety switch including a mechanical connection between said truck and trailer and operable to close said safety switch to energize said motor to apply the trailer brakes if the trailer should be disconnected from the truck.

2. A brake system for a truck-trailer combination comprising:
   a. a truck brake system including a pedal and being operable to apply the truck brakes by depression of said pedal,
   b. a trailer brake system including an electric motor, and being operable by energization of said motor to apply the trailer brakes, said trailer brake system being hydraulic, including a hydraulic pump driven by said motor to apply the trailer brakes, its output pressure being generally proportionate to its speed of operation, said motor being of a variable-speed type,
   c. an operating electrical circuit for said motor, including a normally open control switch and a speed control device operable to vary the speed of said motor,
   d. control means operable by depression of said pedal to first close said control switch, and then to actuate said speed control device to increase the operating speed of said motor in generally proportionate relation to the pressure with which said pedal is depressed, and
   e. manually operable means independent of any depression of said pedal both to close said control switch and also to operate said speed control device.

3. A brake system for a truck-trailer combination comprising:
   a. a truck brake system including a pedal and operable to apply the truck brakes by depression of said pedal,
   b. a trailer brake system including an electric motor, and operable by energization of said motor to apply the trailer brakes, said trailer brake system being hydraulic, including a hydraulic pump driven by said motor,
   c. an operating electrical circuit for said electric motor, and including a normally open control switch,
   d. control means operable by depression of said pedal to close said control switch,
   e. a conduit connecting the outlet of said pump to the trailer brakes to apply them,
   f. a selector valve in said conduit and operable to deliver fluid selectively either to said trailer brakes or to other hydraulically operated accessories of said trailer, but normally to said trailer brakes,
   g. an electrically actuated valve operator operable when energized to position said selector valve to deliver fluid to said accessories,
   h. an operating electric circuit for said valve operator, and
   i. a normally open, manually operable switch interposed in said last named circuit.

4. A system as recited in claim 3 wherein said motor is provided with a second operating electric circuit including said selector switch but not said control switch, whereby setting said selector valve to deliver fluid to said accessories permits operation of said accessories without closure of said control switch by depression of said brake pedal or otherwise.

5. A system as recited in claim 3 wherein said selector valve is operable to seal said conduit to the trailer brakes whenever said valve is positioned to deliver fluid to said accessories, thereby to retain the trailer brakes applied with whatever pressure existed at the moment said selector valve was so positioned, whereby said accessories may be operated without releasing the trailer brakes.

6. A system as recited in claim 5 with the addition of:
   a. a normally closed release valve operable when opened to release pressure in said pump conduit to said trailer brakes, between said selector valve and said brakes,
   b. an electrically actuated valve operator operable when energized to open said release valve, and
   c. an operating electric circuit including said last named valve operator, and
   d. a manually operable switch in said last named circuit.

* * * * *